United States Statutory Invention Registration [19]

[11] Reg. Number: H400

Hammon et al. [43] Published: Jan. 5, 1988

[54] AIMPOINT BIAS FOR TERMINAL HOMING GUIDANCE

[75] Inventors: Ricky K. Hammon, Decatur; Monte K. Helton, Madison; Ray H. Farmer, Huntsville; James F. Meadows, Jr., Hartselle, all of Ala.

[73] Assignee: The United States of America as represented by the Secretary of the Army, Washington, D.C.

[21] Appl. No.: 34,364

[22] Filed: Apr. 6, 1987

[51] Int. Cl.[4] ..... F41G 7/00

[52] U.S. Cl. ..... 244/3.11

*Primary Examiner*—Stephen C. Buczinski
*Assistant Examiner*—Linda J. Wallace
*Attorney, Agent, or Firm*—John C. Garvin, Jr.; Freddie M. Bush; Robert C. Sims

[57] ABSTRACT

This device is a modification to the basic auto-tracker function in missile guidance systems, and consist of three new auto-tracker functions. First the gunner has control of an extra set of crosshairs in the tracker output imagery. The gunner will position this crosshair on the desired impact point of the target while the auto-tracker is tracking the target and issuing guidance commands to the missile. The second part is a discrete command issued by the gunner to the auto-tracker. If the gunner decides his impact point selection is better than the auto-trackers impact point selection he simply commands the auto-tracker to enter the aimpoint bias mode. At this time the auto-tracker will stop tracking the old track point and start tracking the part of the image defined by the gunner controlled crosshair. The third part is the filtered transition of the auto-tracker error signal from the old track point to the new track point. The results of optimum aimpoint selection will be a large improvement in missile kill probability against a wide variety of target and background conditions.

4 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AIMPOINT BIAS FOR TERMINAL HOMING GUIDANCE

DEDICATORY CLAUSE

The invention described herein may be manufactured, used, and licensed by or for the Government for governmental purposes without the payment to us of any royalties thereon.

BACKGROUND OF THE INVENTION

Terminal homing guidance using imaging sensors and auto-trackers is a well established science. In the past, missile guidance has been an autonomous process, after the point of target acquisition and missile launch. The auto-tracker has been required to select, as the target grows from a point source at long range to a high resolution image filling a large percentage of the field-of-view at short range, an appropriate aimpoint for a high probability of kill. This task has proven to be very difficult for a large class of target and background conditions. The level of difficulty also varies with spectrum of operation of the sensor. With the development of link controlled missiles one potential solution for overcoming this auto-tracker deficiency has been provided. A link controlled missile is defined as a missile from which sensor information is down linked to a remote control station, usually manned by a human operator, where the sensor data is processed by a tracking device to compute control signals for both sensor pointing and missile guidance. The control signals are then up linked to the missile to complete the overall closed loop control. The man-in-the-loop concept provides the means for terminal homing guidance which does not depend entirely on autonomous tracker operation.

SUMMARY OF THE INVENTION

This invention consists of a modification of the basic auto-tracker function which gives the human operator of a link controlled missile the option of refining or selection of a new tracker aimpoint during the terminal phase of the missile trajectory. This invention is new in that the auto-tracker no longer operates in an autonomous mode after target acquisition and missile launch but it is provided with the capability of being redirected to another track point during the guidance phase of the missile trajectory.

The invention can be used in any link controlled, terminal homing missile with an imaging sensor. It supplements the limited capability of the auto-tracker in selecting a terminal aimpoint with the intelligence of the human operator. The main advantage of the concept is that the process occurs during the latter stage of the missile trajectory at a range where sufficient pixels are on the target area for optimum aimpoint selection. The results of optimum aimpoint selection will be a large improvement in missile kill probability against a wide variety of target and background conditions.

DETAILED DESCRIPTION OF THE PREFERRED EMBODIMENT

Figure 1:
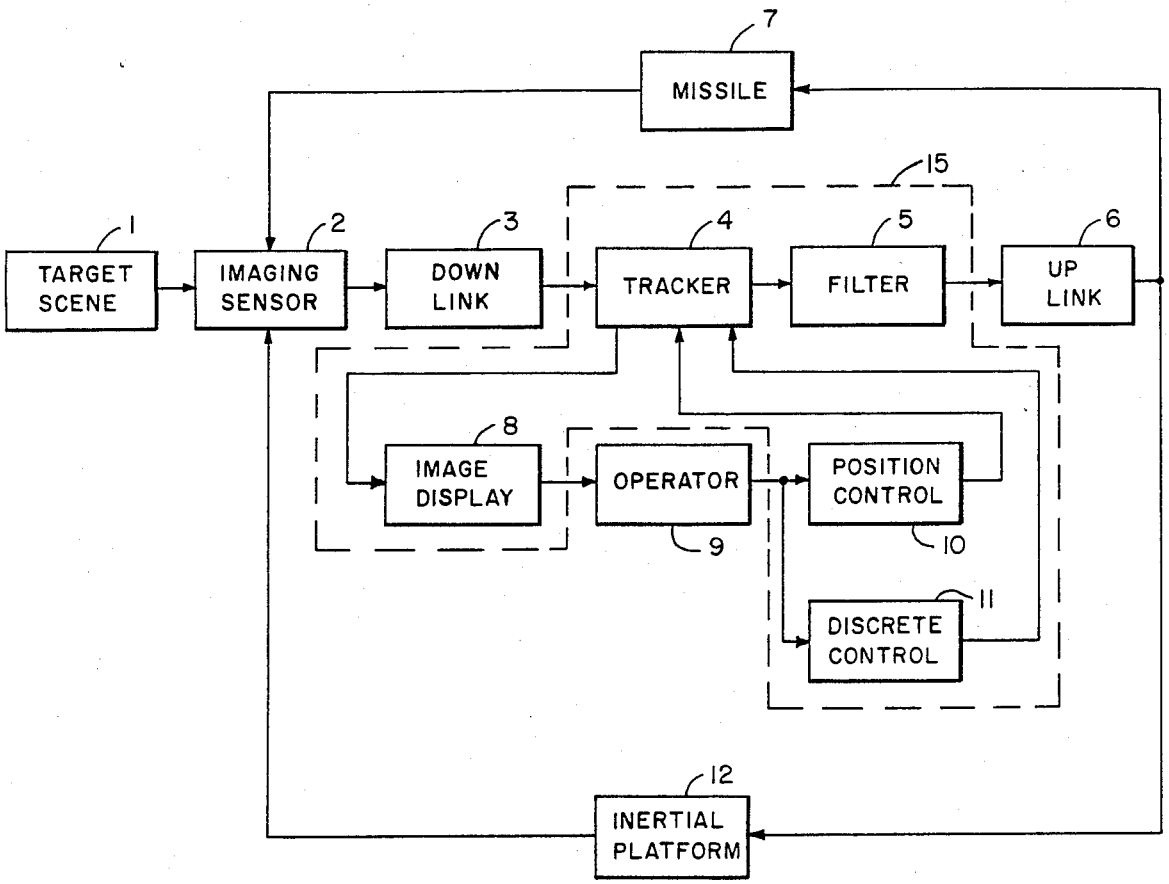
FIG. 1 is a block diagram showing the basic concept of the present invention.
Figure 2:
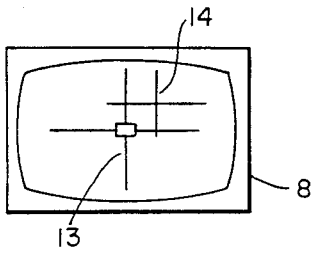
FIG. 2 illustrates how the basic symbology is presented to the operator.

FIG. 1 is a drawing showing the details of the invention with the portion new to or requiring modification indicated by the block 15. The invention consist of three basic parts described next. In normal operation a tracker 4 accepts a video signal from the missile down link 3 and provides a filtered target position 5 to the missile up link 6. The tracker also adds symbology to the video signal before the video is sent to a display monitor 8. FIG. 2 shows how the symbology is presented to the operator 9. The normal auto-tracker operation will be indicated by the position of the crosshair set 13. The operator can observe the relationship of the auto-tracker crosshair with respect to his selection of the optimum target impact point. As the first part of this invention, a second auxiliary set of crosshairs 14 has been added is the normal tracker symbology in the tracker output video. The auxiliary crosshair set 14 has been designed so that the operator can readily differentiate between it and the normal crosshair set 13. The tracker has been modified so that the operator has control over the position of the auxiliary crosshair set 14 through a position control device 10. The control device 10 can be a joystick, trackball, mouse or any other such known positioning mechanism. The only requirement is to provide a means of communicating an x-y position coordinate pair to the tracker so that the tracker can, after receiving this coordinate pair, position the auxiliary crosshair set in response to the operator's command. The operator's command can be either a rate command or a position command. In the case of a rate command the control device 10 would be required to integrate the operator's command before transmitting the position input required by the tracker. In the demonstration of the concept it was found that an operator rate command was preferable.

A second part of this invention is a modification to the tracker so that when the tracker receives a discrete command 11 from the operator, the tracker will abandon its current track point and from that point forward in time will track the target information centered about the position of the auxiliary crosshair set 14 at the time of reception of the discrete command. The method of changing track points is must readily accomplished by placing the auto-tracker into a correlation track mode at reception of the discrete command and using, as a correlation reference, that portion of the image centered about the coordinates of the auxiliary crosshair set 14. In the case of a moving target, care must be taken to restrict the size of the correlation surface to be no larger than the target size to prevent acquisition of part of the background with the target. This was the technique used in the demonstration of the concept. However, other tracker mechanisms can be used to achieve the same objective. The process of refining the aimpoint can be continued by sending succesive discrete commands until the desired track point is achieved.

The final part of this invention is the addition of a filter 5 at the tracker output. The filter is required to prevent large transient commands, immediately following the aimpoint transition, from slewing the sensor platform at a rate faster than is trackable by the tracker and also to prevent undue perturbations in the missile autopilot loop. The filter should have no effect on the system operation except during an aimpoint transition, hence it is keyed to the discrete command 11. One method of filtering the tracker output is by the use of a linear ramp. Two linear ramp functions were tested and both were found to do the job quite well. One is a function of time and the other is a function of the field of view. The function of time $\beta(t)$ is defined according to FIG. 3 where $\beta(t)=0$ for time less than the time of occurrence of the discrete command 11 at which point it begins a linear ramp up to 1.0 in the $t_R$ seconds. Using this function the filter 5 can be implemented as:

$$Y(\text{new})=(1-\beta(t))*X(\text{old})+\beta(t)*X(\text{new})$$

Where

Y(new)=filter output

X(old)=tracker aimpoint coordinates pair before discrete Command (11)

X(new)=tracker aimpoint coordinate pair after discrete Command (11)

The time $t_R$ is chosen to be the minimum time interval which is large enough to prevent tracker loss of lock during the largest expected aimpoint shift. From our testing the optimum $t_R$ proved to be 0.5 seconds. During the aimpoint shift the seeker output is linearly transitioned from the old trackpoint coordinates to the new trackpoint coordinates. After time interval $t_R$ seconds from reception of the discrete command the filter output is replaced by the new trackpoint coordinates and the function $\beta(t)$ is reset for reception of any subsequent discrete command. If another discrete command is issued before the filtered transition is complete the current value of the filter output is taken as X(old) and the filter is restarted. In the case of the field of view ramp, the transition is divided into small increments of the field of view and time is allowed to vary. Thus the changes are small enough to allow the tracker to keep up with ease and also allows the transition to proceed rapidly for small modifications of the aimpoint.

Figure 3:
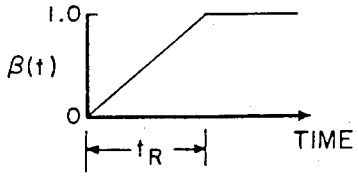
FIG. 3 illustrates the time function of the filter 5.

One complete operation cycle of the invention is described in the context of the system shown in FIGS. 1, 2 and 3. A target scene 1 is converted into a video signal by an imaging sensor 2. The imaging sensor is mounted on an inertially stabilized platform 12 which in turn is carried by a terminal homing missile 7. The video signal is down linked 3 to a remote location. In normal operation the tracker 4 generates missile guidance signals and platform pointing signals by tracking an acquired target feature in the video image. These signals are up linked 6 to the missile 7 and to the inertial platform 12 to close the guidance loop through the imaging sensor 2. As the range to the selected target feature decreases the operator 9 monitors the trackpoint of the auto-tracker by observing the primary crosshair set 13 on the image display 8. In addition, using the position control 10 the operator places a second set of crosshairs 14 on the desired impact point, if it is different from the impact point determined by the auto-tracker. If so, then at the appropriate time to go the operator sends a discrete command 11 to the tracker. Upon receipt of this command the tracker transitions its trackpoint to the trackpoint indicated by the position of the auxiliary crosshair set 14. The filter 5 provides a smooth transition of trackpoint information from the old trackpoint to the new trackpoint. After this transition the missile 7 and sensor platform are commanded to the new impact point until either impact or until a subsequent discrete command 11 selects a new trackpoint.

We claim:

1. In a terminal homing guidance system using imaging sensors and auto-trackers the improvement comprising the addition of monitor display having a first set of crosshairs indicating the aimpoint of the auto-trackers, a second set of crosshairs whose position is under the control of an operator for selecting a different aimpoint, and discrete control means for selectively transferring the aimpoint of said auto-trackers from said first set of crosshairs to said second set of crosshairs.

2. A system as set forth in claim 1 further comprising a filter means connected to the auto-trackers for preventing large transient commands after said discrete control means transfers the aimpoint.

3. A system as set forth in claim 2 wherein said filter means uses a linear ramp function.

4. A system as set forth in claim 3 where said filter can be started and restarted upon the activation of said discrete control means.

* * * * *